United States Patent
Okura et al.

(10) Patent No.: US 6,801,352 B2
(45) Date of Patent: Oct. 5, 2004

(54) ELECTRODEPOSITION DISPLAY DEVICE

(75) Inventors: Hiroshi Okura, Kanagawa (JP); Tohru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/408,103

(22) Filed: Apr. 8, 2003

(65) Prior Publication Data

US 2003/0218791 A1 Nov. 27, 2003

(30) Foreign Application Priority Data

Apr. 15, 2002 (JP) ..................... 2002-112089

(51) Int. Cl.[7] .................. G02F 1/03; G02F 1/153; G02F 1/1333; H01J 17/49; G09G 3/28

(52) U.S. Cl. .............. 359/253; 359/245; 359/254; 359/272; 359/267; 313/582; 313/584; 313/587; 349/86; 345/72; 345/96

(58) Field of Search ............... 359/251, 252, 359/253, 254, 245, 267, 272, 223; 313/582, 583, 584, 587; 349/86, 106; 345/58, 72, 92, 96, 98

(56) References Cited

U.S. PATENT DOCUMENTS

| | | | | |
|---|---|---|---|---|
| 4,519,676 A | * | 5/1985 | te Velde | 359/223 |
| 6,384,953 B1 | * | 5/2002 | Russell et al. | 359/245 |
| 6,414,435 B1 | * | 7/2002 | Akiba | 313/584 |
| 6,574,028 B2 | * | 6/2003 | Esener et al. | 359/254 |
| 6,696,787 B2 | * | 2/2004 | Akiba | 313/582 |

FOREIGN PATENT DOCUMENTS

| | | |
|---|---|---|
| JP | 6-52358 | 7/1994 |
| JP | 10-56261 | 2/1998 |
| JP | 2003-21848 | 1/2003 |

OTHER PUBLICATIONS

M. Nishizawa, et al., "Template Synthesis of Polypyrrole-—Coated Spinel $LiMn_2O_4$ Nanotubules and Their Properties as Cathode Active Materials for Lithium Batteries", J. Electrochem. Soc., vol. 144, No. 6, pp. 1923–1927 (Jun. 1997).

* cited by examiner

Primary Examiner—Loha Ben
(74) Attorney, Agent, or Firm—Fitzpatrick, Cella, Harper & Scinto

(57) ABSTRACT

An electrodeposition display device includes a first substrate, a second substrate facing the first substrate, walls for sealing off the substrates, plating liquid sealed in between the substrates so as to form a cell, a first electrode disposed on at least a part of the first substrate, and a second electrode disposed within the cell. Display is performed by applying signals corresponding to image information to the first electrode and the second electrode, so as to change the state thereof to a state wherein electrodeposition of metal has occurred on at least part of the first electrode, and a state wherein at least a part of metal on the first electrode has become disassociated.

21 Claims, 11 Drawing Sheets

FIG. 5A
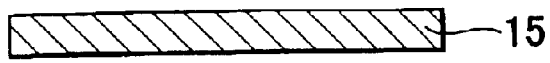
FIG. 5B
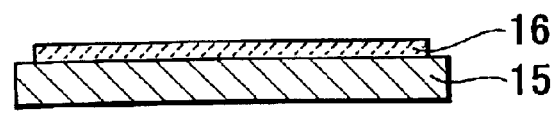
FIG. 5C
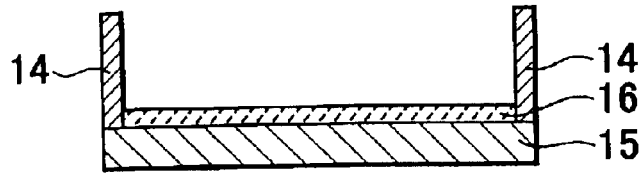
FIG. 5D
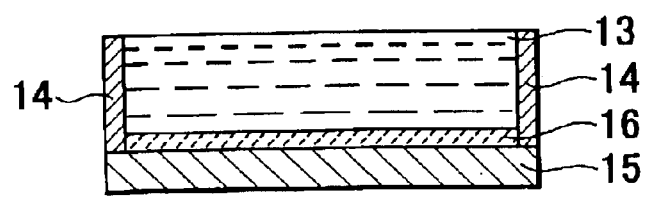
FIG. 5E
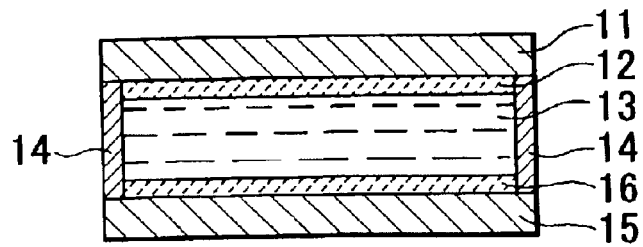

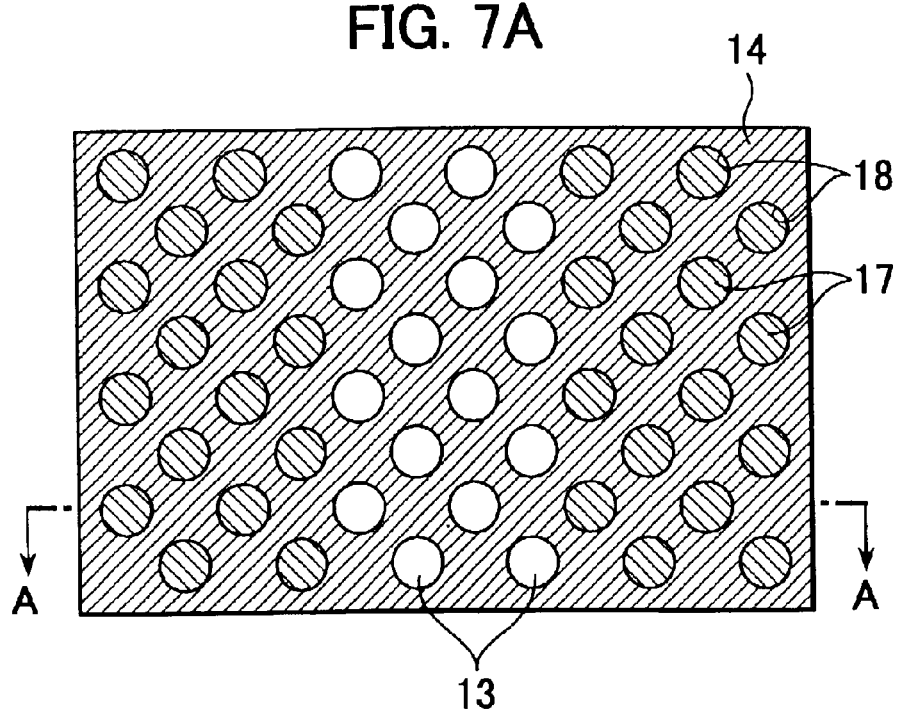
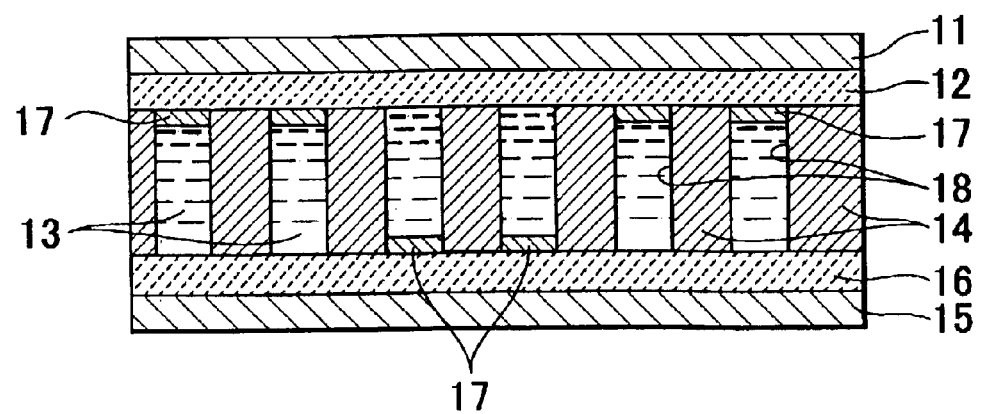

T1

T2

T3

T4

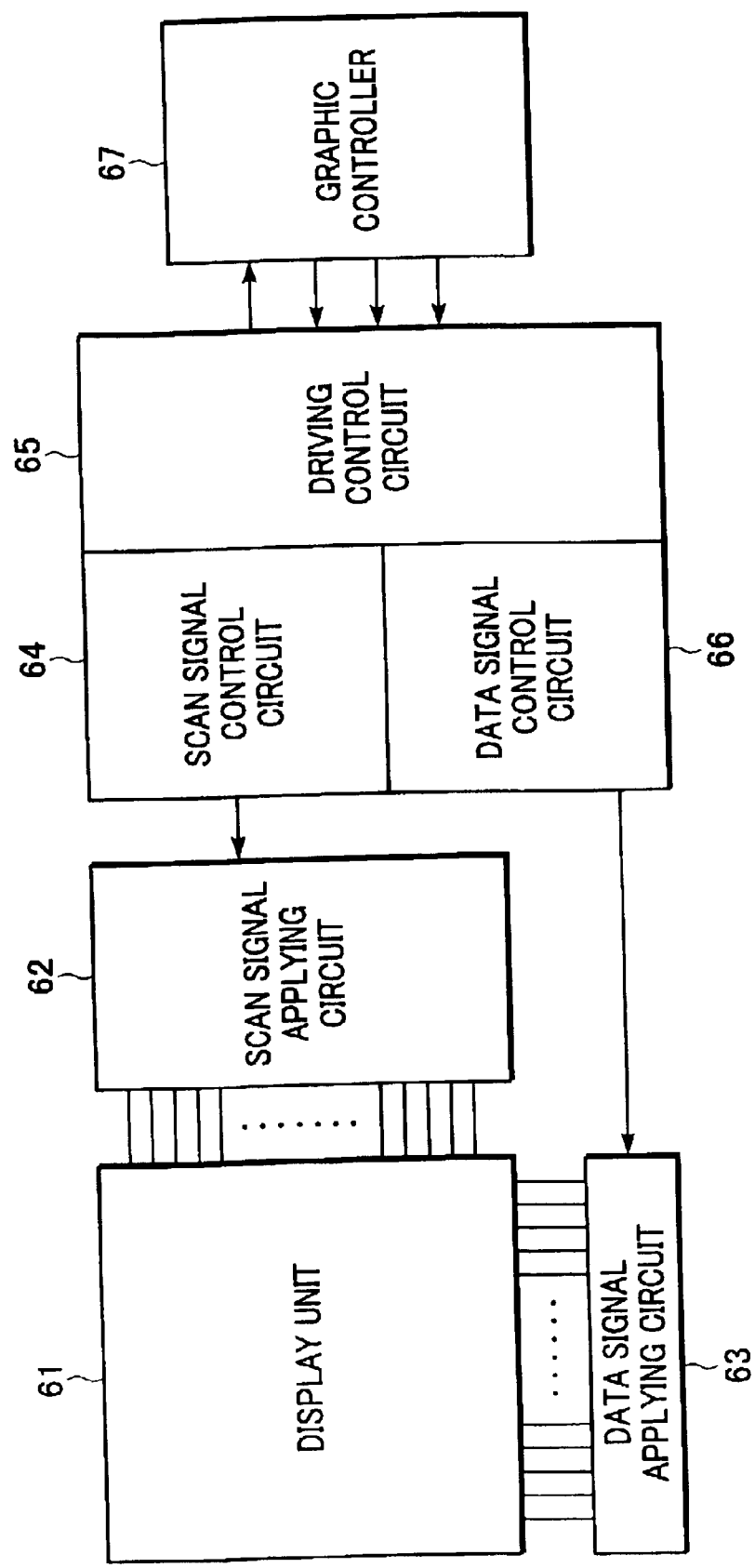

ELECTRODEPOSITION DISPLAY DEVICE

BACKGROUND OF THE INVENTION

1. Field of the Invention

The present invention relates to an electrodeposition display device which performs display with the electrodeposition method, and more particularly, to an electrodeposition display device with high memory capabilities and which can be driven with lower electrical power consumption.

2. Description of the Related Art

In recent years, advances in information display devices has led to the need to display devices which are thin and consume little electric power. At the center of interest is the liquid crystal display device, which is used in laptop computers and navigation systems, for examples, as a display device instead of conventional CRT displays. However, problems such as flickering and cross-talk and so forth have not yet been sufficiently solved with such liquid crystal display devices. Widespread development of new display devices is continuing to solve these problems.

An example of a device regarding which hopes are high to solve the problems of conventional liquid crystal display devices is the reflective display device. Reflective liquid crystal display devices have also been developed, but the electrophoresis display device, which is a new structure, is developing as a display device to replace liquid crystal display devices. The electrophoresis display device was invented by Harold D. Less et al. Japanese Patent Publication No. 6-52358 discloses an electrophoresis display device.

On the other hand, plating technology has been long known as an easy coating method, and plating techniques using various types of materials have been reported so far. One example is an electrodeposition technique called through-hole plating, which is often used for manufacturing printed wiring boards. Rapid advance of semiconductor integrated circuits has lead to increased density and layers in printed wiring boards. The width and intervals between the patterns have become narrow and small, the diameter of through-holes and lands reduced in size, and further increased layers is increasing the aspect ratio.

Through-hole plating is often carried out by the subtractive method. The steps are as follows: preparing a copper-clad laminate, opening holes, electroless copper plating, panel copper plating (primary electrolytic copper), photoresist processing, pattern copper plating (secondary electrolytic copper), surface plating, etching, terminal plating, and finishing. Also, various methods for plating the through-hole parts have also been reported, one of which is Japanese Patent Laid-Open No. 10-56261.

Other methods for electrodeposition of metal within a pre-fabricated cell have also been reported. An example is given in J. Electrochem. Soc. Vol. 144 No. 6, P1923, Jun. 1997. A great many examples of applications using such electrodeposition are given, such as minute array electrodes, printed boards, GMRs, electron sources, various types of masks, and so forth. Application to even more fields is expected by further improvement in capabilities.

However, conventional display devices have had the following points demanding improvement. That is to say, there have been problems of poor memory capability at times, with a phenomena occurring wherein display completely disappears or contrast gradually becomes weaker upon stopping application of potential. In other words, there has been the need to continuously apply potential in order to maintain the displayed state, necessitating improvement from the perspective of cost. Also, demanding high-responsivity at high contrast has required voltage of several dozen volts or higher, meaning that the electric consumption is great.

SUMMARY OF THE INVENTION

The present invention has been made in light of the above-described problems, and accordingly, it is an object thereof to provide an electrodeposition display device with high memory capabilities which can be driven with lower electrical power consumption, and further be capable of readily replacing display color for each cell, by using the electrodeposition method.

To achieve the above objects, the electrodeposition display device according to the present invention comprises: a first substrate; a second substrate facing the first substrate; walls for sealing off the substrates; plating liquid sealed in between the substrates so as to form a cell; a first electrode disposed on at least a part of the first substrate; and a second electrode disposed within the cell; wherein display is performed by applying signals corresponding to image information to the first electrode and the second electrode, so as to change the state thereof to a state wherein electrodeposition of metal has occurred on at least part of the first electrode, and a state wherein at least a part of metal on the first electrode has become disassociated.

The second electrode is preferably on at least the second substrate, the walls, or the first substrate. A plurality of the second electrodes may exist within the sealed cell.

The current density for the electrodeposition is preferably within the range of 1 to 100 mA/cm$^2$, and the metal is preferably nickel, copper, or cobalt.

The walls are preferably formed of anodic porous alumina, and the first substrate may be the front side or rear side of the device.

Also, with an arrangement wherein a plurality of the first electrodes and a plurality of the second electrodes are arrayed in matrix form, with cells disposed at the intersections between the first electrodes and the second electrodes, the device preferably further comprises: first driving means for applying scan signals or data signals to the first electrodes; and second driving means for applying data signals or scan signals to the second electrode.

Thus, a display device with high memory capabilities which can be driven with lower electrical power consumption can be realized. Also, the display color for each cell can be easily replaced, facilitating color display, and color display is particularly easy in the event of using anodic porous alumina.

Further objects, features and advantages of the present invention will become apparent from the following description of the preferred embodiments with reference to the attached drawings.

BRIEF DESCRIPTION OF THE DRAWINGS

FIGS. 5A through 5E are diagrams illustrating the manufacturing method of a cell according to a first embodiment of the present invention.

FIGS. 7A and 7B are diagrams illustrating a display example of an image of the third embodiment of the present invention.

FIG. 11 is a block diagram illustrating an example of the overall system configuration of the fourth embodiment of the present invention.

DESCRIPTION OF THE PREFERRED EMBODIMENTS

Next, embodiments of the present invention will be described in detail with reference to the drawings. The primary features of the electrodeposition display device according to the present invention is that the device can be driven with lower electrical power consumption due to using electrodeposition, and has high memory capabilities. The configuration and principles of operations of this electrodeposition display device will be described with reference to FIGS. 1A through 4C.

(a) Cell Configuration

Figure 1A:
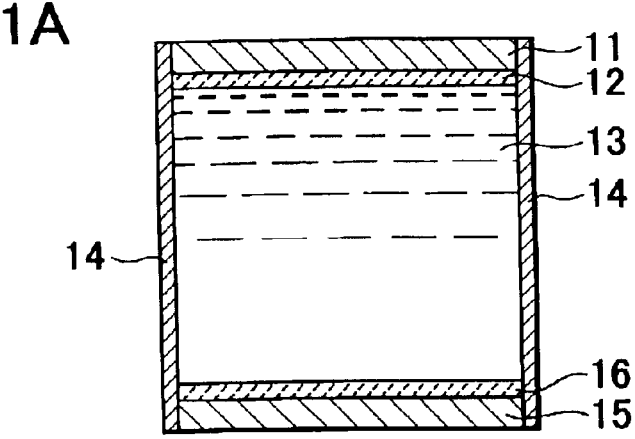
FIGS. 1A through 1C are cross-sectional diagrams describing the configuration of a cell with the electrodeposition display device according to the present invention, and electrodeposition.

FIG. 1A shows the basic configuration of a cell. First, as shown in FIG. 1A, a first electrode 12 is disposed on a first substrate 11, a second electrode 16 is disposed on a second substrate 15 which faces the first substrate 11, and plating liquid 13 is sealed therebetween. This arrangement is sealed off with walls 14 so that the plating liquid 13 does not leak out, thus forming a cell. The term "walls" here refers to the parts other than the first substrate 11 and the second substrate 15 facing one another, placed to prevent the plating liquid 13 from leaking out. As described later, anodic porous alumina can be suitably used for the walls 14.

Now, in the event that no metal ions exist in the plating liquid at the initial state, there is need for metal to be made to adhere to the first electrode 12 or second electrode 16 beforehand. An example of the method for supplying metals is shown in FIGS. 2A through 2C.

Figure 2A:
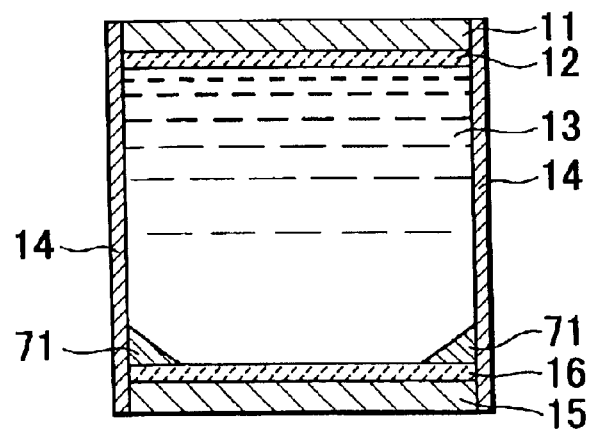
FIGS. 2A through 2C are cross-sectional diagrams illustrating supply source metal of the electrodeposition display device according to the present invention.
Figure 2B:
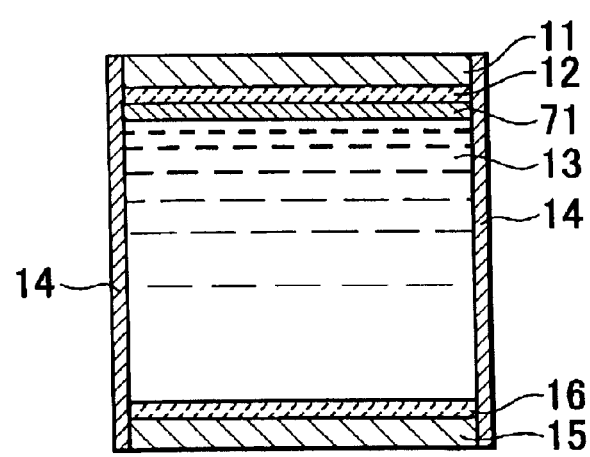
Figure 2C:
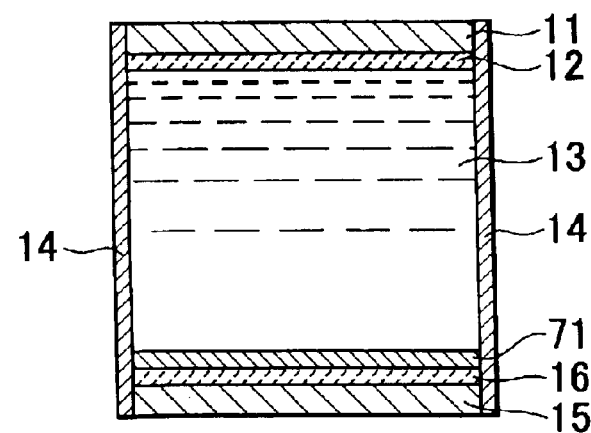

FIG. 2A illustrates an example wherein a supply source metal 71 has been provided on one part of the second electrode 16, FIG. 2B on the entire face of the first electrode 12, and FIG. 2C on the entire face of the second electrode 16. With each of these cases, applying positive potential to the electrode where the metal has adhered causes the metal to be dissolved in the plating liquid 13, thus activating as an electrodeposition display device. At this time, metal ions may or may not be contained in the plating liquid 13.

Figure 3A:
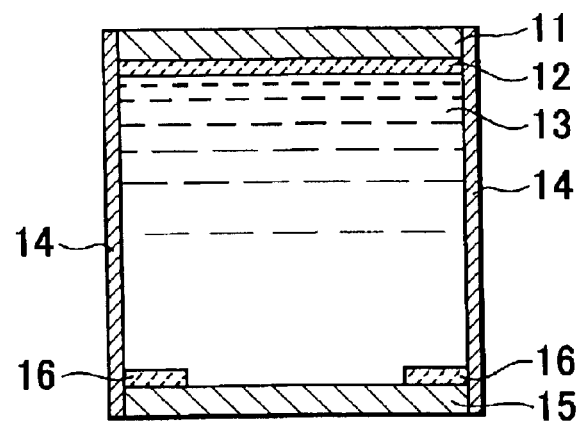
FIGS. 3A through 3C are cross-sectional diagrams illustrating the position of the second electrode of the electrodeposition display device according to the present invention.
Figure 3B:
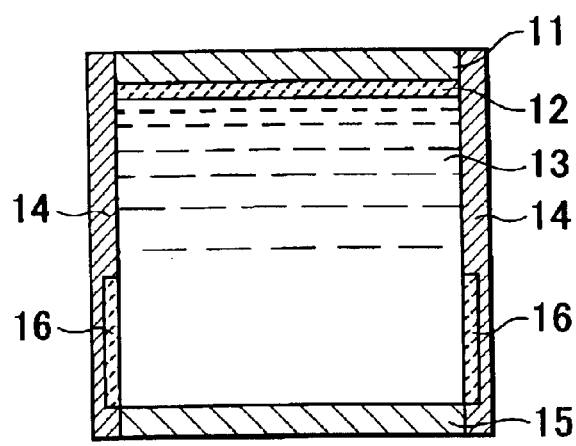
Figure 3C:
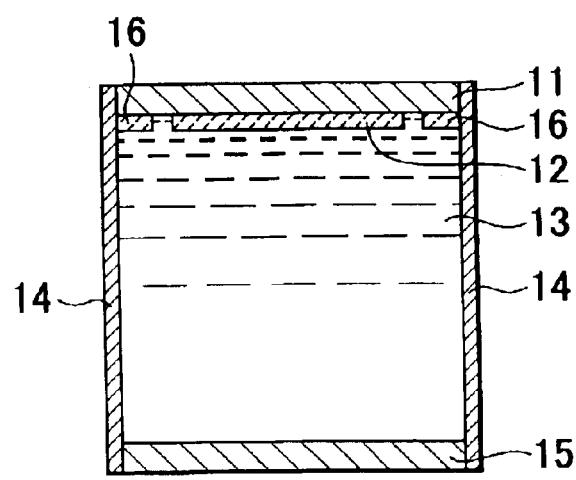

Also, the first and second electrodes 12 and 16 are provided adjacent to the plating liquid 13. The first electrode 12 may be provided on the entire face of the first substrate 11, or on a part thereof. The second electrode 16 may be provided on the first substrate 11, on the second substrate 15, or on the walls 14, at a desired position. That is to say, in addition to an arrangement such as shown in FIG. 1A wherein the second electrode 16 is provided on the entire face of the second substrate 15, the second electrode 16 may be provided on a part of the second substrate 15 as shown in FIG. 3A, on the walls 14 as shown in FIG. 3B, or on the first electrode 12 as shown in FIG. 3C. Also, the metal for electrodeposition here is not restricted to one type of metal; rather, the metals which can be used with the present invention include all blended materials which are capable of repeated deposition and dissolution upon application of potential.

Now, in the event of using transmitted light for display, one of the arrangements shown in FIGS. 3A through 3C is preferable. Transparent electrodes formed of Indium-Tin Oxide (ITO), tin oxide doped with fluorine, etc., can be suitably used for the electrodes at the side of incident light. Metal electrodes may also be used for electrodes at the side other to that of incident light. In the event of using metal electrodes, metals which themselves do not readily react to application of potential, i.e., titanium, platinum, etc., are suitably used for the electrodes.

Further, the material and thickness of the first and second substrates 11 and 15 can be designed as suitable according to the endurance required of the electrodeposition display device. Glass substrates, plastic substrate, etc., may be used as suitable, as long as the substrate at the side of incident light transmits light. In addition to these materials, metals substrates, ceramic substrates, etc., may be used as suitable for the substrate at the side with no incident light.

(b) Electrodeposition Process I

Next, deposition of metal upon application of negative potential on the first electrode 12 using the plating liquid 13 will be described with reference to FIG. 1B.

Figure 1B:
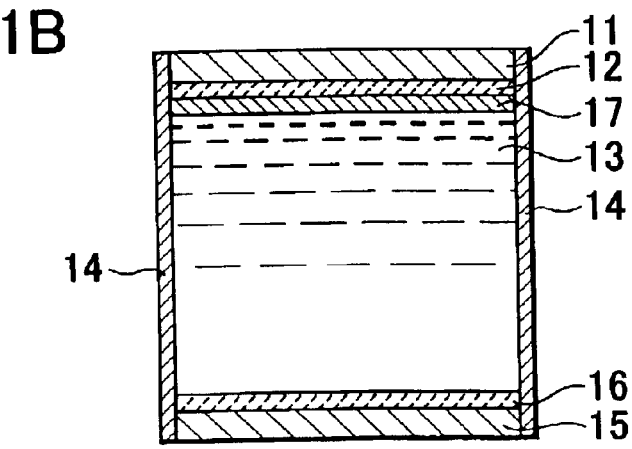

Negative potential and positive potential are respectively applied to the first electrode 12 and the second electrode 16 of the assembled cell, whereby the metal ions dissolved in the plating liquid 13 become metal 17 and are deposited on the first electrode 12, as shown in FIG. 1B. Now, a common plating liquid such as copper, nickel, cobalt, etc., can be used for the plating liquid 13. However, a plating liquid which does not react with the materials of the cell is preferable. Of course, a potential difference whereby metal is deposited is necessary for the potential applied, and an ion concentration sufficient to cover the face of the first electrode 12 is necessary.

Also, common metal ion solutions are colored, so the color of the metal ion solution can be displayed at the time of transmitting with an electrodeposition display device using transmission and reflection, and at the time of reflection off of the second electrode 16 with a electrodeposition display device using reflection of the first electrode 12 and second electrode 16. That is to say, color display can be made by cobalt ions being red, nickel ions being green, and copper ions being blue.

In the event that the light enters from the first substrate 11 side, light is not transmitted through the interior of the cell, but rather is transmitted through the first substrate 11 and first electrode 12, and reflects at the metal face. On the other hand, in the event that the light enters from the second substrate 15 side, the light is transmitted through the interior of the cell, further transmitted through the second substrate 15, second electrode 16, and plating liquid 13, and reflects off of the metal face 17. In either case, the materials for the substrate and electrode through which the light is transmitted should be such with high photo-transmissivity, such as glass with a transparent electroconductive film formed thereupon, for example.

(c) Electrodeposition Process II

Next, dissolution of the metal upon application of a positive potential to the first electrode using the plating liquid will be described with reference to FIG. 1C.

Figure 1C:
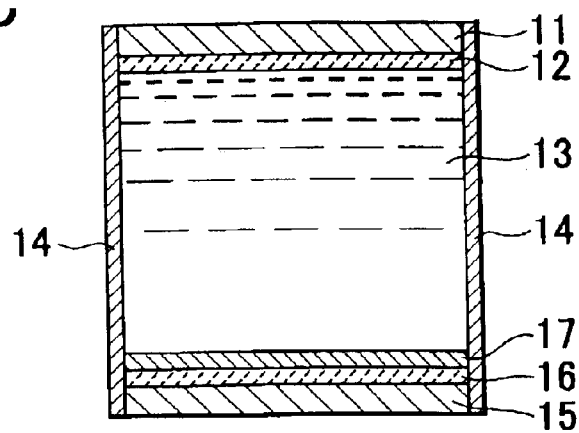

Applying positive potential and negative potential respectively to the first electrode 12 and second electrode 16 of the assembled cell causes the metal 17 deposited on the first substrate 11 to be dissolved into the plating liquid 13, as shown in FIG. 1C. Now, negative potential is being applied to the second electrode 16, so deposition of the metal 17 can occur. In the event that the light enters from the first substrate 11, the light is transmitted through the first substrate 11, first electrode 12, and plating liquid 13, and is reflected off of the metal face 17 on the second electrode 15.

Conversely, in the event that the light enters from the second substrate 15, the light is transmitted through the second substrate 15 and second electrode 16, and is reflected off of the metal face 17. Thus, display can be carried out by changing the state between that in FIG. 1B and that in FIG. 1C. In the event that the arrangement is such that the second substrate 15 is not covered with the second electrode 16, as shown in FIGS. 3A through 3C, light is transmitted upon applying positive potential to the first electrode 12. This allows contrast to be effected by reflection and transmission.

Figure 4A:
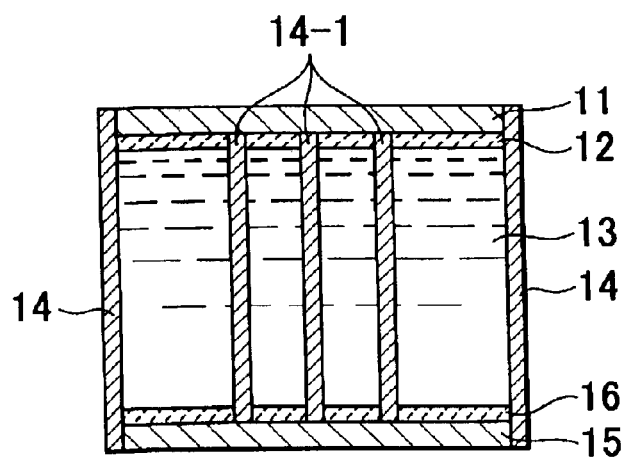
FIGS. 4A through 4C are cross-sectional diagrams illustrating other examples of walls.
Figure 4B:
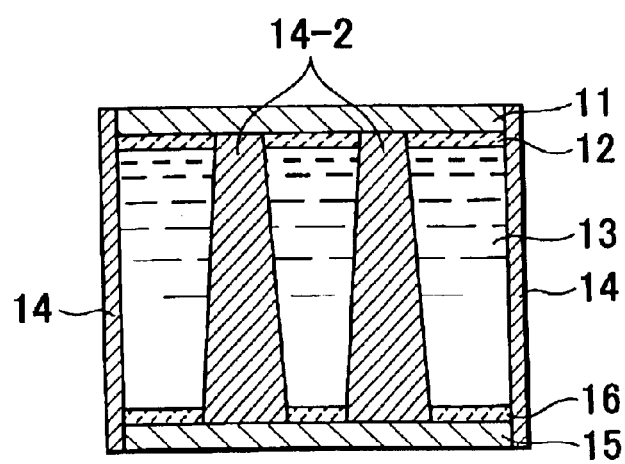
Figure 4C:
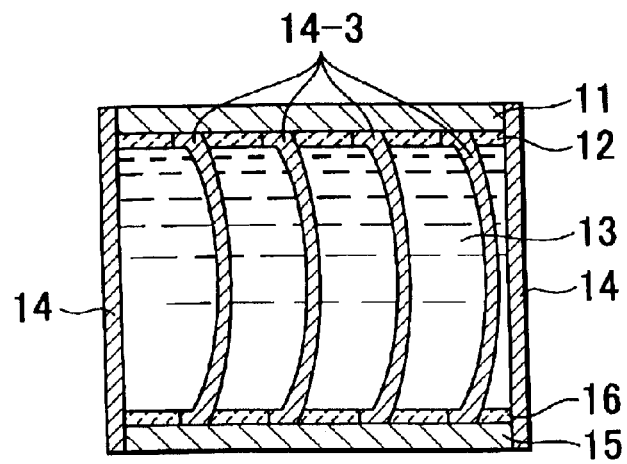

Also, the wall parts of the present embodiment are not restricted to straight shapes forming cells with uniform diameters as described above, and various arrangements may be made according to the purpose. For example, cells with different diameters may be formed by forming walls 14-1 as shown in FIG. 4A, cells wherein the diameter of walls 14-2 change as shown in FIG. 4B may be formed, and cells which are non-linear due to walls 14-3 being formed in arced shapes such as shown in FIG. 4C may be formed.

Next, embodiments of the present invention will be described. The Inventor fabricated an electrodeposition display device described above, and performed display therewith. With the manufacturing methods according to the following first through fourth embodiments, a display device having pixels arrayed in a 450 row by 300 columns matrix on a substrate is used, but description will be made with regard to the manufacturing method for a single pixel of the pixels arrayed in the 450 row by 300 columns matrix, to facilitate description. In reality, a display device was fabricated having individual pixels arrayed in a 450 row by 300 columns matrix on a first substrate having planar dimensions of 75 mm by 75 mm, such as described in FIGS. 5A through 5E.

First Embodiment

Description of the first embodiment will be made with reference to FIGS. 1A through 1C, 3A through 3C, and 5A through 5E. FIGS. 5A through 5E illustrate the manufacturing process. Note that FIGS. 5A through 5E illustrate the manufacturing process for one pixel.

First, an ITO film was formed as the first electrode 12 on a glass substrate serving as the first substrate 11, and patterned (see FIG. 5E). Next, an ITO film was formed as the second electrode 16, as shown in FIG. 5B, on a glass substrate serving as the second substrate 15, as shown in FIG. 5A, and patterned by photolithography and dry etching. The lines were formed 50 μm in width.

Next, walls 14 were formed on the second substrate 15, as shown in FIG. 5C. The walls 14 were formed by spin coating application of a photosensitive epoxy resin (PMER NCA 2000 PMT-1 manufactured by Tokyo Ohka Kogyo Co., Ltd.) at 1,000 rpm for 10 seconds, followed by UV exposure and wet developing with a developer liquid for the photosensitive epoxy resin, thus forming walls 30 μm high and 10 μm wide. This sample was used as a working electrode, and cobalt was electrodeposited on the electrode, thereby yielding the supply source metal 71.

Further, following forming a heat-bonding adhesion layer (not shown) at the face of contact between the walls 14 and the first substrate 11 as shown in FIG. 5D, inside the walls 14 was filled with the plating liquid 13. Next, the first substrate 11 having the first electrode 12 patterned thereupon, and the walls 14 were positioned and applied as shown in FIG. 5E, thereby forming a cell. A voltage applying circuit (not shown) was provided thereto, thus forming the display device shown in FIG. 3A.

Next, display was performed using the display device thus fabricated. The application voltage was set at 3 V. The plating liquid 13 used with the present embodiment does not contain metal ions at the initial step, so positive voltage was first applied to the second electrode 16. That is to say, with the second electrode 16 as the positive electrode and the first electrode 12 as the ground, deposition of metal of the first electrode 12 was confirmed. On the other hand, reversing the voltage polarity applied to the electrodes so that the first electrode 12 is the ground and the second electrode 16 is the negative electrode caused the metal on the first electrode 12 to be dissolved and metal was deposited on the second electrode 16.

Also, following application of voltage to the first electrode 12 and the second electrode 16, the connection between the voltage application circuit and the first electrode 12 and the second electrode 16 was cut off, but metal was fixed on the electrode to which the negative potential was applied last, thus, confirming the memory functions of the device.

Second Embodiment

A display device for making color display was fabricated for the second embodiment. That is to say, R, G, and B colored plating liquid (cobalt, nickel, and copper) were used as the plating liquid 13 with the second embodiment, and a color display device was fabricated wherein these are combined to form one pixel.

The method for forming the cell is the same as with the first embodiment. First, an ITO film was formed as the first electrode 12 on the glass substrate serving as the first substrate 11, and patterned. Next, as shown in FIGS. 5A and 5B, an ITO film was formed as the second electrode 16 on the glass substrate serving as the second substrate 15, and patterned by photolithography and dry etching. The lines were formed 50 μm in width.

Next, walls 14 were formed, as shown in FIG. 5C. The walls 14 were formed by spin coating application of a photosensitive epoxy resin (PMER N-CA 2000 PMT-1 manufactured by Tokyo Ohka Kogyo Co., Ltd.) at 1,000 rpm for 10 seconds, followed by UV exposure and wet developing with a developer for the photosensitive epoxy resin, thus forming walls 30 μm high and 10 μm wide.

Further, following forming a heat-bonding adhesion layer (not shown) at the face of contact between the walls 14 and the first substrate 11 as shown in FIG. 5D, inside the walls 14 was filled with the plating liquid 13. Note however, that with the second embodiment, cobalt, nickel, and copper were used as the plating liquid 13 as described above, and the three types, i.e., the cobalt, nickel, and copper, were filled in neighboring cells in that order, for example, so as to form one pixel of the combination of the three cells. Next, the first substrate 11 having the first electrode patterned thereupon, and the walls 14 were positioned and applied as shown in FIG. 5E, thereby forming a cell. A voltage applying circuit (not shown) was provided thereto, thus forming a display device.

Next, display was performed using the display device thus fabricated. The application voltage was set at 3 V. The plating liquid 13 of cobalt, nickel, and copper, used with the present embodiment contains metal ions, and metal was deposited on the negative electrode by application of voltage. As described above, R, G, and B colored plating liquids (cobalt, nickel, and copper) are used for the plating liquid 13, and these colors are combined to form one pixel. Display made with this configuration successfully displayed images in color. With the second electrode 16 as the positive electrode and the first electrode 12 as the ground, deposition of metal of the first electrode 12 was confirmed. On the other hand, reversing the voltage polarity applied to the electrodes so that the first electrode 12 is the ground and the second electrode 16 is the negative electrode caused the metal on the first electrode 12 to be dissolved and metal was deposited on the second electrode 16.

Also, following application of voltage to the first electrode 12 and the second electrode 16, the connection between the voltage application circuit and the first electrode 12 and the second electrode 16 was cut off, but metal was fixed on the electrode to which the negative potential was applied last, thus, confirming the memory functions of the device.

Third Embodiment

Figure 6A:
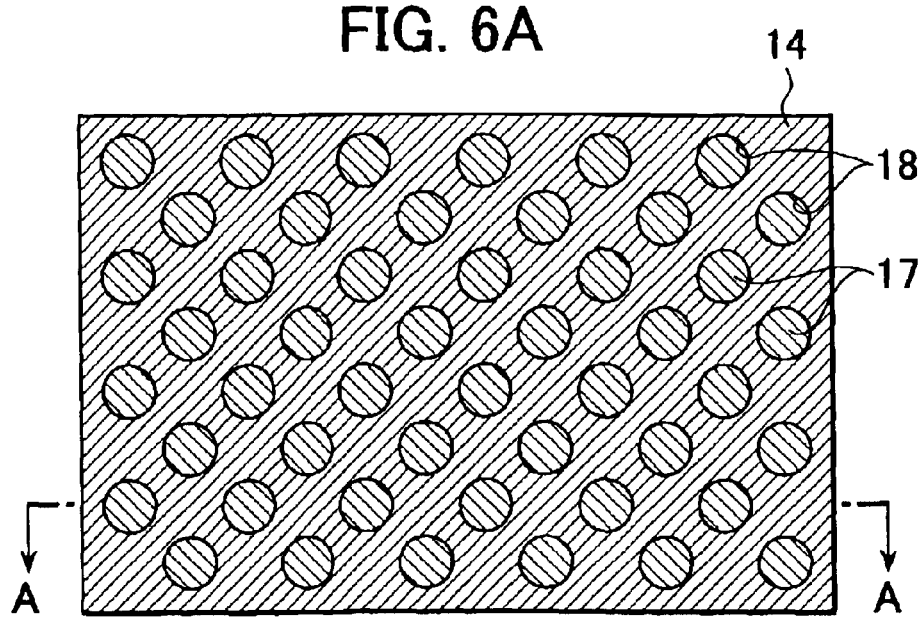
FIGS. 6A and 6B are diagrams illustrating a third embodiment of the present invention.
Figure 6B:
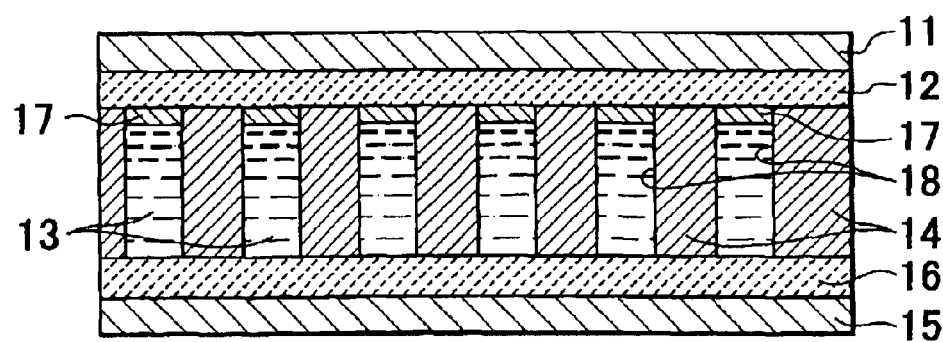

With the third embodiment, anodic porous alumina were formed using platinum for a base layer, and cobalt plating liquid was sealed in the holes, thereby fabricating an electrodeposition display device. FIGS. 6A and 6B illustrate the configuration of a display device according to the third embodiment. FIG. 6A is a plan view, and FIG. 6B is a cross-sectional view taken along the line A—A in FIG. 6A. Note that FIG. 6A illustrates a state wherein the first substrate 11 and the second substrate 16 are applied one to 19 another.

First, a quartz substrate was used as the second substrate 15, and following forming patterned film of titanium and platinum to serve as the second electrode 16 on the quartz substrate, an aluminum film was formed to a thickness of 500 nm. Argon gas was used at this time, under a gas pressure of 30 mTorr and RF power of 300 W.

Next, anodization processing was performed thereupon, using an anodization device. A 0.3 M oxalic acid aqueous solution was used as the electrolyte, which was maintained at 17° C. in a thermostatic chamber. Here, the anodization voltage used as DC 40 V, and the anodization processing was carried out by displaying the value of the current on a monitor, and confirming penetration into the base layer by reduction in the current value.

Following the anodization processing, the article was washed with purified water and isopropyl alcohol. Pore-widening processing wherein the article is bathed in a phosphoric acid solution was performed for 40 minutes, and the surface was polished, thereby forming the walls 14 of the nano-structures. Reference numeral 18 in FIGS. 6A and 6B denote the alumina nano-holes formed by the anodization processing, yielding cylindrical alumina nano-holes 18 in a regular two-dimensional array.

Next, a film of ITO was formed as the first electrode 12 on the glass substrate 11, and patterned by photolithography and dry etching. Next, inside the alumina nano-holes 18 was filled with the cobalt plating liquid 13, as shown in FIG. 6B, and the first substrate 11 having the first electrode 12 patterned thereupon was positioned and applied, thereby fabricating the display device shown in FIGS. 6A and 6B. A voltage applying circuit (not shown) was provided thereto, thus forming the display device.

Next, display was performed using the display device thus fabricated. The application voltage was set at 3 V. The cobalt plating liquid used with the present embodiment deposited metal on the negative electrode under application of voltage. Accordingly, with the second electrode 16 as the positive electrode and the first electrode 12 as the ground, deposition of metal 17 on the first electrode 12 was confirmed. On the other hand, reversing the voltage polarity applied to the electrodes so that the first electrode 12 is the ground and the second electrode 16 is the negative electrode caused the metal on the first electrode 12 to be dissolved and metal was deposited on the second electrode 16. FIGS. 6A and 6B illustrate a state wherein the metal 17 has been deposited on the first electrode 12 in all of the cells.

Also, following application of voltage to the first electrode 12 and the second electrode 16, the connection between the voltage application circuit and the first electrode 12 and the second electrode 16 was cut off, but metal was fixed on the electrode to which the negative potential was applied last, thus, confirming the memory functions of the device.

FIGS. 7A and 7B illustrate an example of a case of displaying an image. FIG. 7A is a plan view, and FIG. 7B is a cross-sectional view taken along the line A—A in FIG. 7A. Note however, that FIG. 7A illustrates the state before the first substrate 11 and the second substrate 16 are applied one to another. In FIGS. 7A and 7B, an image is shown wherein the metal 17 has been deposited on the first electrode 12 in some of the cells, and the metal 17 has been deposited on the second electrode 16 in the remaining cells. Color display can be performed with the display device according to the third embodiment by using R, G, and B colored plating liquid (cobalt, nickel, and copper) as with the second embodiment. Also, while the shape of the alumina nano-holes in the third embodiment have been described as being circular, other shapes, such as polygons like triangles, squares, etc., for example, may be used.

Fourth Embodiment

The fourth embodiment is an example wherein, with a display device fabricated using the manufacturing method shown in FIG. 5 having individual pixels arrayed in a 450 row by 300 columns matrix on the first substrate having planar dimensions of 75 mm by 75 mm manufactured with the same manufacturing method as the first embodiment, a 9-pixel part of 3 pixels by 3 pixels arrayed in matrix form is focused upon. A display device having simple matrix wiring of 3 rows by 3 columns was fabricated, and simple matrix driving was carried out.

Figure 8:
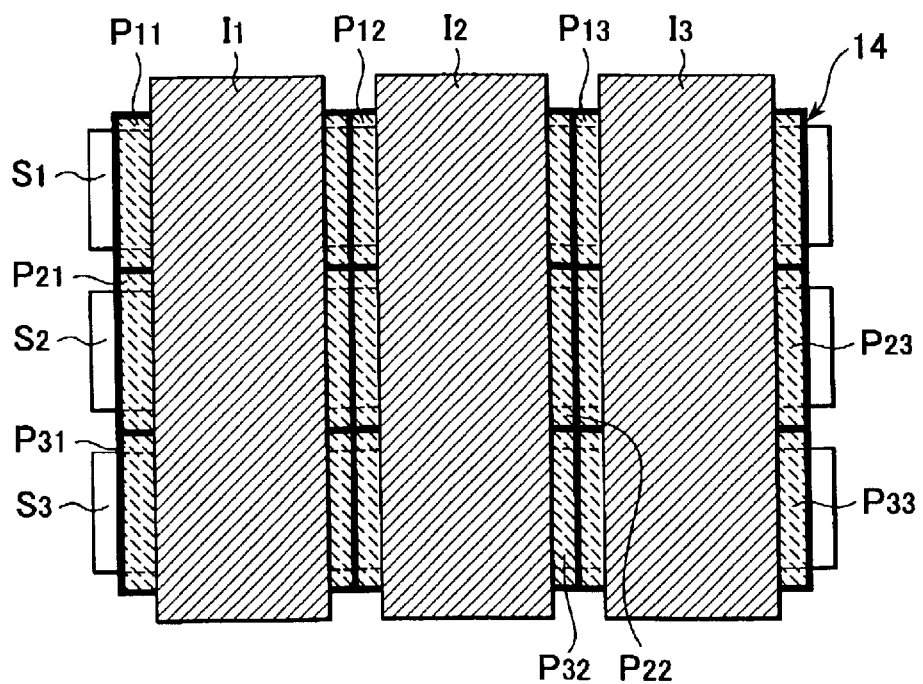
FIG. 8 is a schematic configuration diagram illustrating a fourth embodiment of the present invention.

FIG. 8 is a schematic configuration diagram of the display device according to the fourth embodiment. The sideways lines in FIG. 8 are the scan signal lines (S1–S3) which are equivalent to the second electrode 16, and the vertical lines are data signal lines (11–13) which are equivalent to the first electrode 12. Pixels P11–13, P21–P23, and P31–P33 are formed at the intersections between the scan signal lines (S1–S3) and the data signal lines (11–13). Reference numeral 14 denotes the walls in this embodiment as well.

Figure 9A:
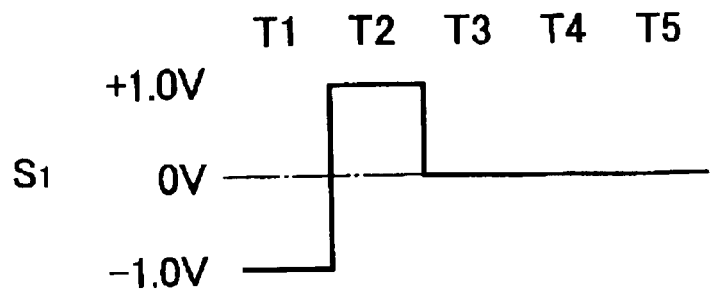
FIGS. 9A through 9F are timing charts illustrating applications of signals according to the fourth embodiment of the present invention.
Figure 9B:
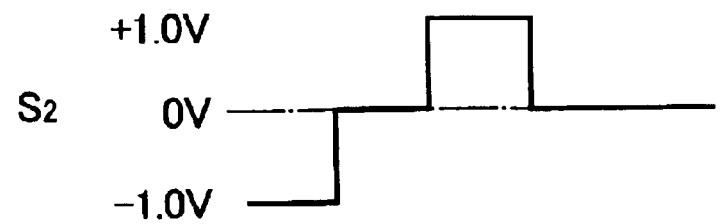
Figure 9C:
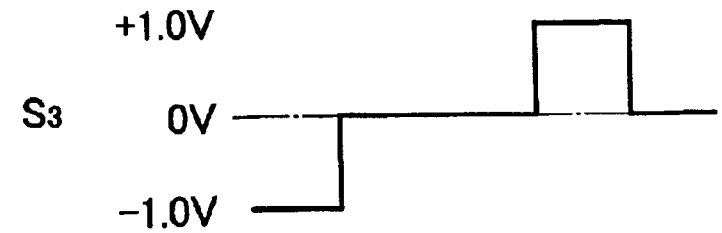
Figure 9D:
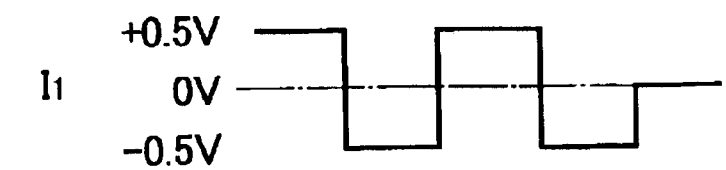
Figure 9E:
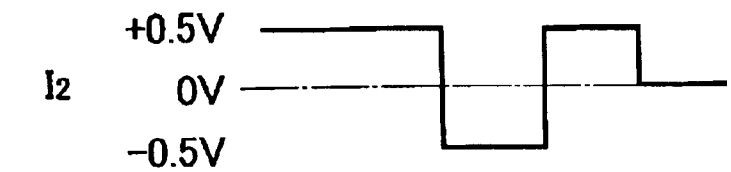
Figure 9F:
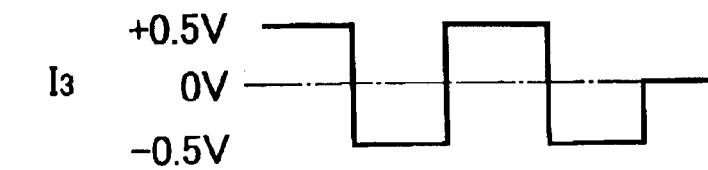
Figure 10A:
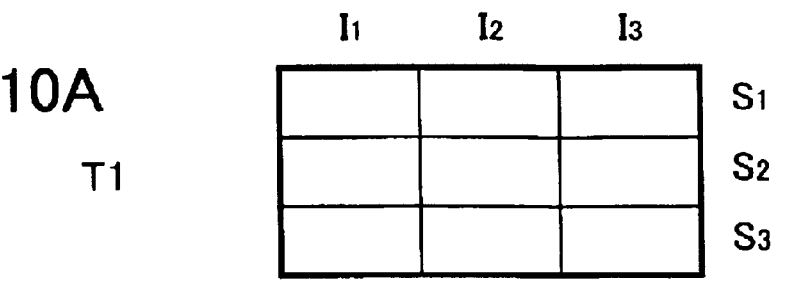
FIGS. 10A through 10D are diagrams illustrating image patterns of the fourth embodiment of the present invention.

FIGS. 9A through 9F are timing charts illustrating applications of signals corresponding to image information, and FIGS. 10A through 10D illustrate image patterns. Next, the operations will be described following FIGS. 9A through 10D. FIGS. 9A through 9C show the signal application timing for the scan signal lines, and FIGS. 9D through 9F show the signal application timing for the data signal lines. First, −1 V was applied to the scan signal lines S1 through S3 at time T1 as shown in FIGS. 9A through 9C, and +0.5 V was applied to the data signal lines 11 through 13 as shown in FIGS. 9D through 9F, for an all-white display (the state shown in FIG. 1C). Note that the image is viewed from the first substrate 11 side. The image pattern displayed at this time is shown in FIG. 10A.

Figure 10B:
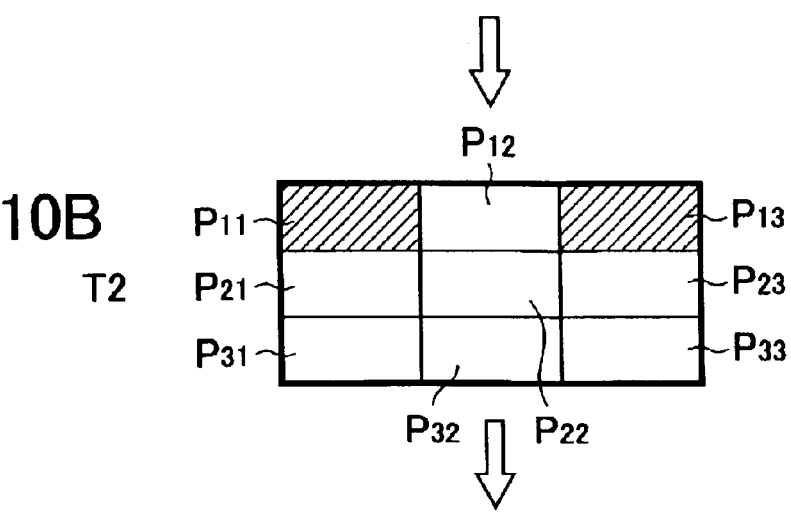

Next, scan signal voltage of +1 V was applied to the scan signal line S1 and 0V was applied to scan signal lines S2 and S3 at time T2 as shown in FIGS. 9A through 9C, and +0.5 V was applied to the data signal line 12 and −0.5 V was applied to the data signal lines 11 and 13 as shown in FIGS. 9D through 9F. At this time, the potential difference is 1.5 V for pixels P11 and P13 alone, and 0.5 V for the rest. Accordingly, the cobalt ions in the pixels P11 and P13 move onto the data signal lines 11 and 13, such that, with regard to the image pattern, the pixels P11 and P13 are colored black as shown in FIG. 10B (the state shown in FIG. 1B).

Figure 10C:
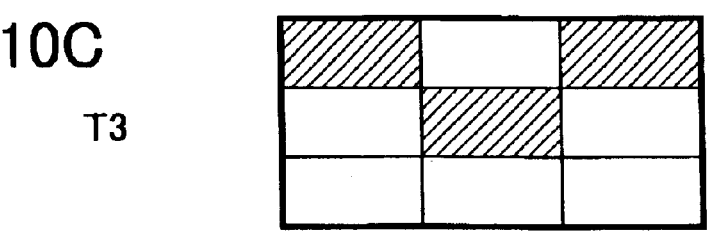
Figure 10D:
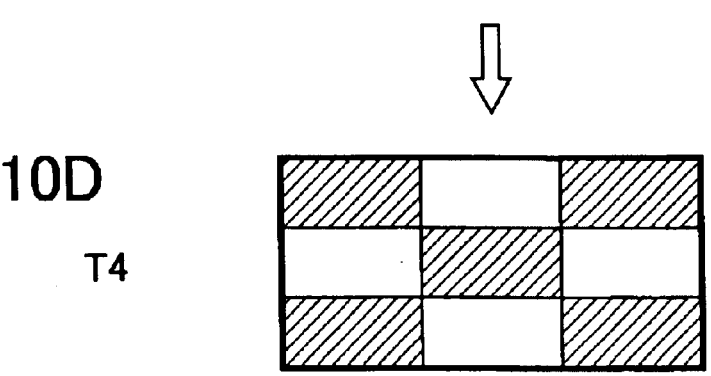

Next, scan signal voltage of +1 V was applied to the scan signal line S2 and 0V was applied to scan signal lines $S_1$ and S3 at time T3 as shown in FIGS. 9A through 9C, and −0.5 V was applied to the data signal line 12 and +0.5 V was applied to the data signal lines 11 and 13 as shown in FIGS. 9D through 9F. At this time, the potential difference is 1.5 V for pixel P22 alone, and 0.5 V for the rest. Accordingly, the cobalt ions in the pixel P22 move onto the data signal line 12, such that the pixel P22 is colored black as shown in FIG. 10C. Also, the pixels other than pixel P22 maintain the display made at the time T2.

Subsequently, voltage was applied in the same manner at times T4 and T5 following the time charts shown in FIGS. 9A through 9F, and line-sequence scanning was performed. The image pattern such as shown in FIGS. 10A through 10D were made in a satisfactory manner as a result of the signal application. These image patterns can be maintained in a good display state even in the event that the electric power is cut off, since metal is deposited.

Also, while the above embodiment describes the second electrode 16 as being the scan signal lines and the first electrode 12 as being the data signal lines, the same advantages as the configuration described above can be obtained with an arrangement with the first electrode 12 as being the scan signal lines and the second electrode 16 as being the data signal lines.

FIG. 11 illustrates an example of an overall system configuration of the electrodeposition display device according to the present embodiment. This display device comprises a display unit 61 having the matrix electrodes configured of the scan signal lines and the data signal lines described with reference to FIGS. 8 through 10D, a scan signal applying circuit 62 for applying scan signals to the plating liquid 13 via the scan signal lines, an data signal applying circuit 63 for applying data signals to the plating liquid 13 via the data signal lines, a scan signal control circuit 64, data signal control circuit 66, driving control circuit 65, and a graphic controller 67.

Plating liquid 13 is disposed between the scan signal lines and the data signal lines. Data sent from the graphic controller 67 passes through the driving control circuit 65 and is input to the scan signal control circuit 64 and data signal control circuit 66, and converted into address data and display data, respectively. Subsequently, the scan signal applying circuit 62 generates scan signals following the address data, and applies these signals to the scan signal lines of the display unit 61. Also, the data signal applying circuit 63 generates data signals following the display data, and applies these signals to the data signal lines of the display unit 61, thus displaying an image.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electrodeposition display device, comprising:
    a first substrate;
    a second substrate facing said first substrate;
    walls for sealing off said substrates and forming a cell between said first and second substrates;
    plating liquid sealed within said cell;
    a first electrode disposed on at least a part of said first substrate;
    a second electrode disposed within said cell; and
    a metal disposed within said cell,
    wherein display is performed by applying signals corresponding to image information to said first electrode and said second electrode, so as to effect a first state wherein electrodeposition of the metal occurs on at least part of said first electrode, and a second state wherein at least a part of the metal on said first electrode becomes disassociated.

2. An electrodeposition display device according to claim 1, wherein said second electrode is on at least said second substrate.

3. An electrodeposition display device according to claim 1, wherein said second electrode is on at least said walls.

4. An electrodeposition display device according to claim 1, wherein said second electrode is on at least said first substrate.

5. An electrodeposition display device according to any one of claims 1 through 4, wherein a plurality of said second electrodes exist within said sealed cell.

6. An electrodeposition display device according to any one of claims 1 through 4, wherein the current density for the electrodeposition is within the range of 1 to 100 mA/cm$^2$.

7. An electrodeposition display device according to any one of claims 1 through 4, wherein said metal is nickel, copper, or cobalt.

8. An electrodeposition display device according to any one of claims 1 through 4, wherein said walls are formed of anodic porous alumina.

9. An electrodeposition display device according to any one of claims 1 through 4, wherein said first substrate is a front side of said device for viewing images.

10. An electrodeposition display device according to any one of claims 1 through 4, wherein said first substrate is a rear side of said device.

11. An electrodeposition display device according to any one of claims 1 through 4, wherein a plurality of said first electrodes and a plurality of said second electrodes are arrayed in matrix form, with cells disposed at the intersections between said first electrodes and said second electrodes, said device further comprising:
    first driving means for applying scan signals or data signals to said first electrodes; and
    second driving means for applying data signals or scan signals to said second electrodes.

12. An electrodeposition display device, comprising:
    a first substrate;
    a second substrate facing said first substrate;
    walls for sealing off said substrates and forming a cell between said first and second substrates;
    plating liquid sealed within said cell;
    a first electrode disposed on at least a part of said first substrate;

a second electrode disposed within said cell;

a metal disposed within said cell; and metal deposition means for displaying an image, with said deposition means effecting a first state wherein electrodeposition of said metal occurs on at least part of said first electrode and a second state wherein at least a part of said metal on said first electrode becomes disassociated.

13. An electrodeposition display device according to claim 12, wherein said second electrode is on at least said second substrate.

14. An electrodeposition display device according to claim 12, wherein said second electrode is on at least said walls.

15. An electrodeposition display device according to claim 12, wherein said second electrode is on at least said first substrate.

16. An electrodeposition display device according to claim 12, wherein a plurality of said second electrodes exist within said sealed cell.

17. An electrodeposition display device according to claim 12, wherein the current density for the electrodeposition is within the range of 1 to 100 mA/cm$^2$.

18. An electrodeposition display device according to claim 12, wherein said metal is nickel, copper, or cobalt.

19. An electrodeposition display device according to claim 12, wherein said walls are formed of anodic porous alumina.

20. An electrodeposition display device according to claim 12, wherein said first substrate is a front side of said device for viewing images.

21. An electrodeposition display device according to claim 12, wherein said first substrate is a rear side of said device.

* * * * *

UNITED STATES PATENT AND TRADEMARK OFFICE
CERTIFICATE OF CORRECTION

PATENT NO. : 6,801,352 B2
DATED : October 5, 2004
INVENTOR(S) : Hiroshi Okura et al.

It is certified that error appears in the above-identified patent and that said Letters Patent is hereby corrected as shown below:

Column 7,
Line 22, "were" should read -- was --.
Line 42, "as" should read -- was --.

Signed and Sealed this

First Day of February, 2005

JON W. DUDAS
*Director of the United States Patent and Trademark Office*